(12) United States Patent
Jeong et al.

(10) Patent No.: US 10,683,955 B2
(45) Date of Patent: Jun. 16, 2020

(54) HOSE CLAMP

(71) Applicants: Hyundai Motor Company, Seoul (KR); Kia Motors Corporation, Seoul (KR)

(72) Inventors: Hae Jun Jeong, Hwaseong-si (KR); Je Yeon Kim, Yangsan-si (KR); Yoon Geun Cho, Daegu (KR); Seung Hyun Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 47 days.

(21) Appl. No.: 16/192,549

(22) Filed: Nov. 15, 2018

(65) Prior Publication Data
US 2020/0088333 A1 Mar. 19, 2020

(30) Foreign Application Priority Data
Sep. 14, 2018 (KR) .......................... 10-2018-0110484

(51) Int. Cl.
| | |
|---|---|
| F16B 2/08 | (2006.01) |
| F16L 33/06 | (2006.01) |
| F16L 33/22 | (2006.01) |
| F16L 33/02 | (2006.01) |
| F16L 33/04 | (2006.01) |
| F16L 33/32 | (2006.01) |

(52) U.S. Cl.
CPC .............. *F16L 33/02* (2013.01); *F16L 33/32* (2013.01); *F16L 33/06* (2013.01)

(58) Field of Classification Search
CPC ......... F16L 33/02; F16L 33/222; F16L 33/32; Y10T 24/1443; Y10T 24/1473; F16B 2/08
See application file for complete search history.

(56) References Cited

U.S. PATENT DOCUMENTS

| | | | | |
|---|---|---|---|---|
| 2,778,085 A | * | 1/1957 | Bernard | F16B 2/08 |
| | | | | 24/268 |
| 2,803,866 A | * | 8/1957 | Flora | B64D 45/00 |
| | | | | 24/268 |

(Continued)

FOREIGN PATENT DOCUMENTS

| | | |
|---|---|---|
| JP | 3324939 B2 | 9/2002 |
| KR | 10-1755848 B1 | 7/2017 |
| KR | 10-1825797 B1 | 2/2018 |

*Primary Examiner* — Robert Sandy
(74) *Attorney, Agent, or Firm* — Morgan, Lewis & Bockius LLP

(57) ABSTRACT

A hose clamp may include a body portion having an annular shape which is open at one portion and surrounding an external surface of a hose and an external surface of an object to be fastened, a stationary portion coupled to an external surface of one end portion of the body portion, a movable portion coupled to an external surface of an opposite end portion of the body portion, and a fastening portion coupled to the stationary portion to be movable along axial directions of the body portion. The fastening portion moves along one of the axial directions of the body portion and presses the movable portion in a first circumferential direction of the body portion such that the one end portion and the opposite end portion of the body portion move toward each other and the body portion inwardly presses and fastens the hose and the object.

10 Claims, 5 Drawing Sheets

(56) References Cited

U.S. PATENT DOCUMENTS

| | | | | |
|---|---|---|---|---|
| 2,922,212 | A | * | 1/1960 | Textrom .................. F16L 33/02 |
| | | | | 24/268 |
| 4,563,795 | A | * | 1/1986 | Fournier ................. F16L 23/04 |
| | | | | 24/19 |
| 4,834,186 | A | * | 5/1989 | Ballard .................. A62C 37/09 |
| | | | | 169/16 |
| 2016/0340093 | A1 | | 11/2016 | Müller |

* cited by examiner

HOSE CLAMP

CROSS-REFERENCE TO RELATED APPLICATION

The present application claims priority to Korean Patent Application No. 10-2018-0110484, filed on Sep. 14, 2018, the entire contents of which is incorporated herein for all purposes by this reference.

BACKGROUND OF THE INVENTION

Field of the Invention

The present invention relates to a hose clamp.

Description of Related Art

A hose clamp is used to connect pipes in a vehicle. The hose clamp is coupled to an end portion of a hose and an end portion of an object to be fastened thereto, which are adjacent to each other, to form a joint and press and hold the hose and the object.

The hose clamp employs a gear structure or a circumferentially-fastened structure to clamp the hose and the object. However, in the case of the circumferentially-fastened structure, clamping or unclamping may be difficult due to a deficiency in space in an engine compartment although a tool with a large radius in the radial direction of the hose has to be used. Furthermore, the gear structure may be naturally loosened in a reverse direction by vibrations transferred to the hose, or may fail to appropriately perform clamping due to wear of spur gears in a pinion.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hose clamp which may be fastened in an axial direction thereof.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a hose clamp may include a body portion having an annular shape which is open at one portion and surrounding an external surface of a hose and an external surface of an object to be fastened, a stationary portion coupled to an external surface of one end portion of the body portion, a movable portion coupled to an external surface of an opposite end portion of the body portion, and a fastening portion coupled to the stationary portion to be movable along axial directions of the body portion. The fastening portion moves along a first axial direction which is one of the axial directions of the body portion and presses the movable portion in a first circumferential direction of the body portion such that the one end portion and the opposite end portion of the body portion move toward each other and the body portion inwardly presses and fastens the hose and the object.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
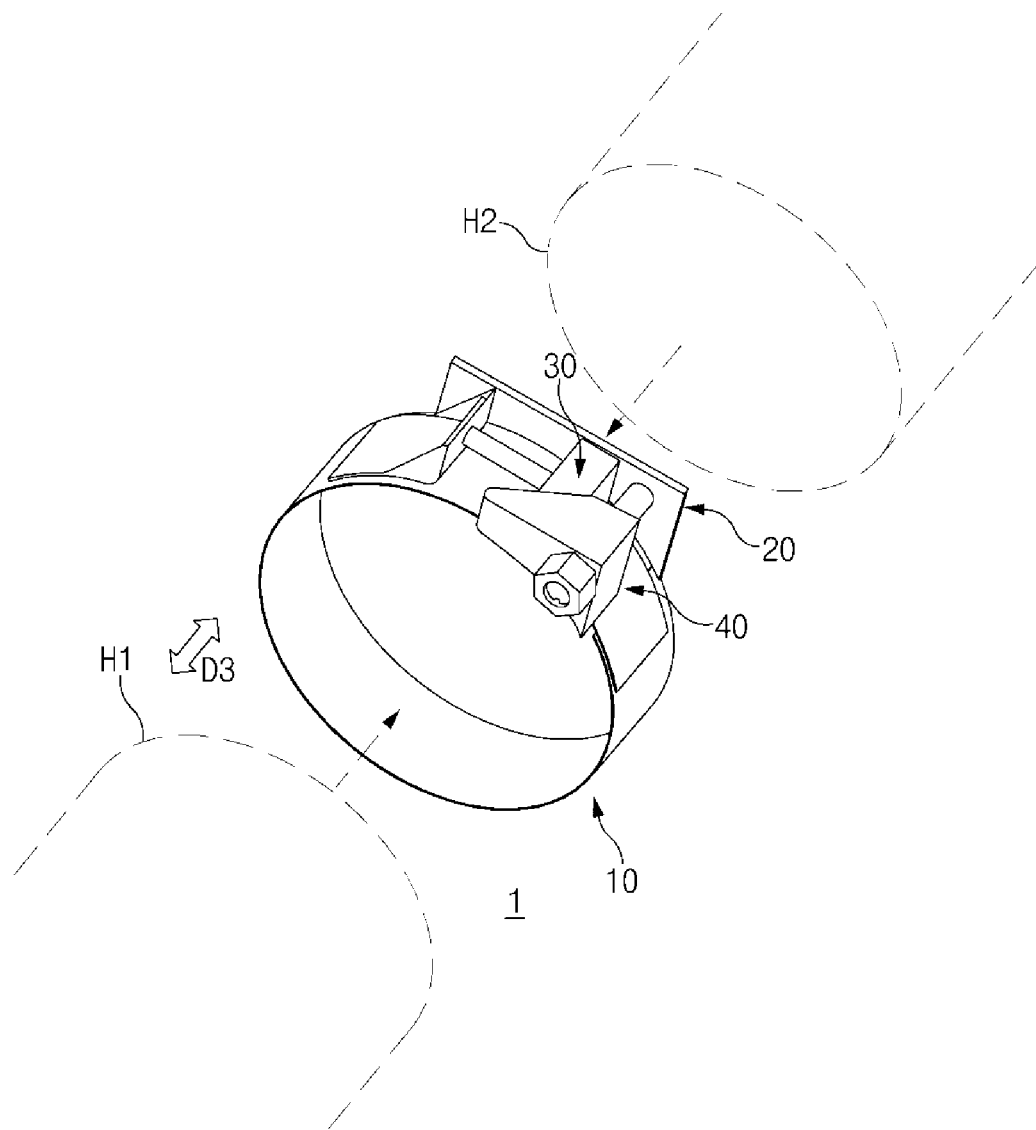
FIG. 1 is a perspective view exemplarily illustrating a hose clamp according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. It may be understood that even if shown in different drawings, identical elements are provided with identical reference numerals in the drawings. Furthermore, in describing the exemplary embodiments of the present invention, detailed descriptions related to well-known functions or configurations will be omitted when they may make subject matters of the present invention unnecessarily obscure.

Terms, such as "first", "second", "A", "B", "(a)", "(b)", and the like, may be used herein to describe elements of the present invention. Such terms are only used to distinguish one element from another element, and the substance, sequence, order, or number of these elements is not limited by these terms. If a component were referred to as "connected", "coupled", or "linked" to another component, they may mean the components are not only directly "connected", "coupled", or "linked" but also are indirectly "connected", "coupled", or "linked" via a third component.

Figure 2:
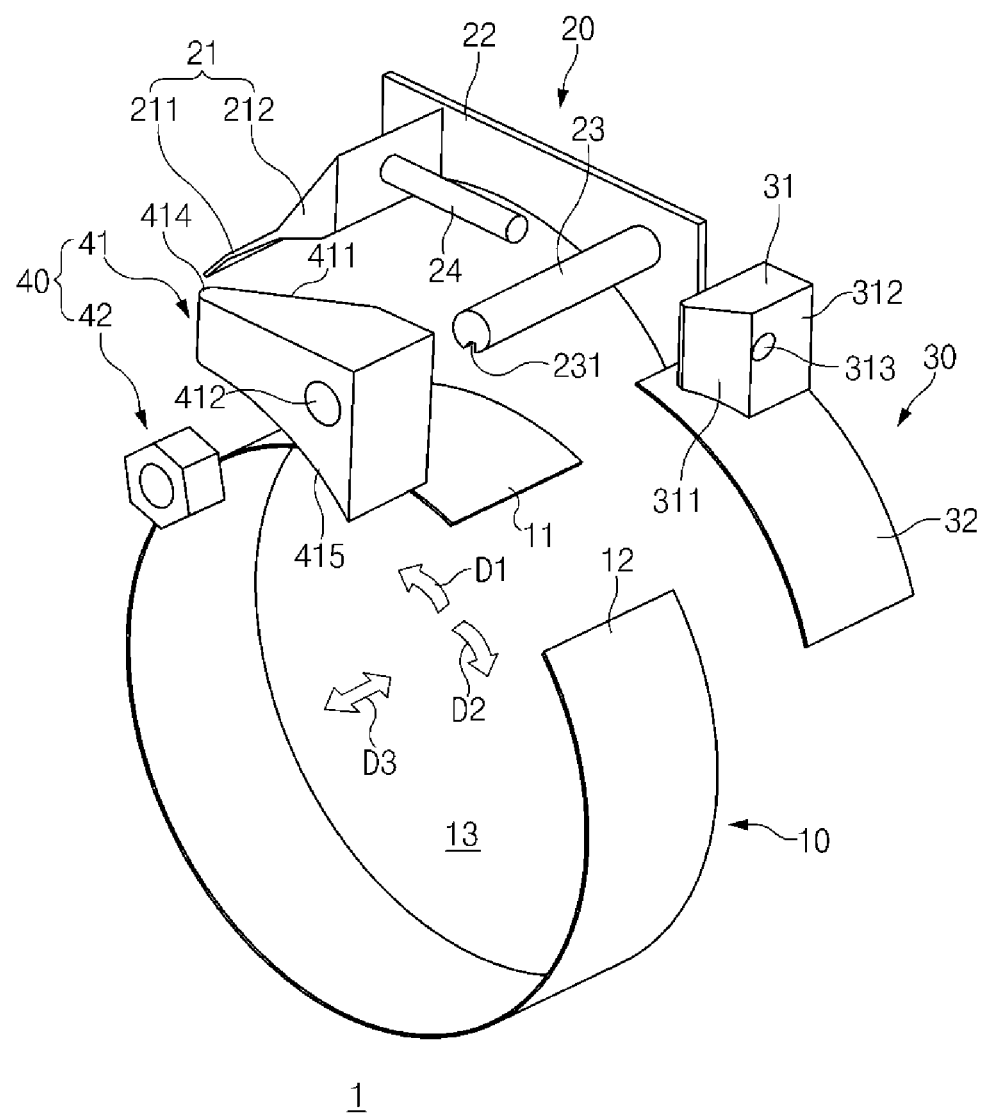
FIG. 2 is an exploded perspective view exemplarily illustrating the hose clamp according to the exemplary embodiment of the present invention.

FIG. 1 is a perspective view exemplarily illustrating a hose clamp 1 according to an exemplary embodiment of the present invention. FIG. 2 is an exploded perspective view exemplarily illustrating the hose clamp 1 according to the exemplary embodiment of the present invention.

Referring to FIG. 1 and FIG. 2, the hose clamp 1 according to the exemplary embodiment of the present invention may include a body portion 10, a stationary portion 20, a movable portion 30, and a fastening portion 40.

The body portion 10 may have an annular shape which is open at one portion thereof. The body portion 10 may surround the external surface of an end portion of a hose H1 and the external surface of an end portion of an object H2 to be fastened to the hose H1. Accordingly, a portion of the internal surface of the body portion 10 may make contact with the external surface of the end portion of the hose H1, and another portion of the internal surface of the body portion 10 may make contact with the external surface of the end portion of the object H2.

The annular body portion 10 may have an internal space 13 formed therein, but may not form a completely closed curve. The body portion 10 may have a cut-away portion, and opposite end portions 11 and 12 of the body portion 10 may be spaced from each other. Among the circumferential directions of the body portion 10, the circumferential direction from the opposite end portion 12 to the one end portion 11 of the body portion 10 may be referred to as a first circumferential direction D1. In contrast, the circumferential direction from the one end portion 11 to the opposite end portion 12 of the body portion 10 may be referred to as a second circumferential direction D2.

Figure 3:
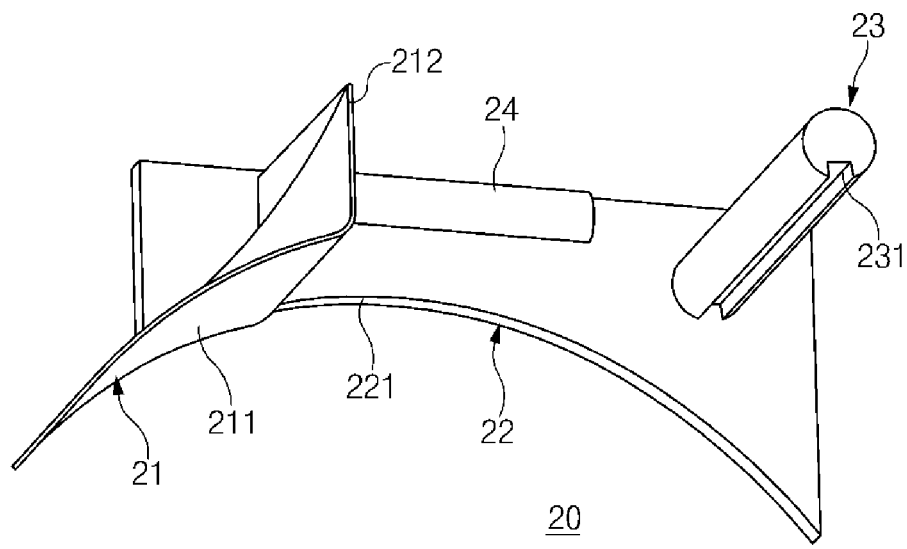
FIG. 3 is a perspective view exemplarily illustrating a stationary portion of the hose clamp according to an exemplary embodiment of the present invention.

FIG. 3 is a perspective view exemplarily illustrating the stationary portion 20 of the hose clamp 1 according to an exemplary embodiment of the present invention. The stationary portion 20 will be described with reference to FIG. 1, FIG. 2, and FIG. 3. The stationary portion 20 may be coupled to the external surface of the one end portion 11 of the body portion 10. The stationary portion 20 may be combined with the movable portion 30, which will be described below, to allow the opposite end portions 11 and 12 of the body portion 10 to move toward or away from each other.

The stationary portion 20 may include a stationary base 21, a stationary extension 22, and a first stationary portion shaft 23. The stationary portion 20 may further include a second stationary portion shaft 24.

The stationary base 21 may be coupled to the external surface of the one end portion 11 of the body portion 10, and the second stationary portion shaft 24 may extend from the stationary base 21. The stationary base 21 may include a base wall 211 having side surfaces corresponding to the shape of the external surface of the one end portion 11 of the body portion 10 and coupled to the one end portion 11 of the body portion 10 and a base protrusion 212 protruding from the base wall 211 in a radially outward direction of the body portion 10. The base protrusion 212 may be disposed on a side of the base wall 211 that faces the second circumferential direction D2 and may have a plate shape perpendicular to the second circumferential direction D2. One side surface of the base protrusion 212 that faces the first circumferential direction D1 may have, at opposite axial end portions thereof, triangular members with a hypotenuse directed at an angle between the radially outward direction of the body portion 10 and the second circumferential direction D2.

The stationary extension 22 may extend from the stationary base 21 toward the opposite end portion 12 of the body portion 10. The stationary extension 22 may be coupled to an end portion of the stationary base 21 which is located on a side of the stationary base 21 in the axial direction thereof. The stationary extension 22 may have a plate shape perpendicular to the axial direction of the stationary base 21. The edge portion of the stationary extension 22 which is adjacent to the body portion 10 may have a curved profile corresponding to the external surface of the body portion 10 and may make contact with the external surface of the body portion 10.

The first stationary portion shaft 23 may extend from the stationary extension 22. The fastening portion 40, which will be described below, may be coupled to the first stationary portion shaft 23 to be movable. The first stationary portion shaft 23 may extend from the stationary extension 22 in a second axial direction opposite to a first axial direction which is one of the axial directions D3 of the body portion 10. The fastening portion 40 may be coupled to the first stationary portion shaft 23 to be movable along an axial direction of the first stationary portion shaft 23.

The first stationary portion shaft 23 may have a shaft groove 231 formed on the external surface thereof along the extension direction of the first stationary portion shaft 23. While the shaft groove 231 is illustrated as being formed on the region of the external surface of the first stationary portion shaft 23 that faces the body portion 10, the location of the shaft groove 231 is not limited thereto. A fastening protrusion 413 of the fastening portion 40, which will be described below, may be inserted into the shaft groove 231 to enable a fastening block 41 to move along the extension direction of the first stationary portion shaft 23 while maintaining a correct posture without rotating.

The stationary portion 20 may further include the second stationary portion shaft 24. The movable portion 30, which will be described below, may be coupled to the second stationary portion shaft 24 to be movable between the one end portion 11 and the opposite end portion 12 of the body portion 10. The second stationary portion shaft 24 may extend from the stationary base 21 in a direction perpendicular to the base protrusion 212 of the stationary base 21 and may protrude toward the first stationary portion shaft 23. The second stationary portion shaft 24 may be inserted into a coupling hole 313 formed in the movable portion 30 which is coupled to the opposite end portion 12 of the body portion 10, and the movable portion 30 may move along the extension direction of the second stationary portion shaft 24.

The movable portion 30 may be coupled to the external surface of the opposite end portion 12 of the body portion 10. The movable portion 30 may be pressed by the fastening portion 40, which will be described below, to move toward or away from the one end portion 11 of the body portion 10. As the movable portion 30 moves in the first circumferential direction D1, the opposite end portions 11 and 12 of the body portion 10 may become closer to each other and the hose H1 and the object H2 to be fastened may be pressed and fixedly held by the internal surface of the body portion 10. As the movable portion 30 moves in the second circumferential direction D2, the opposite end portions 11 and 12 of the body portion 10 may be spaced farther away from each other, and the clamping force exerted on the hose H1 and the object H2 by the body portion 10 may be released.

The movable portion 30 may include a movable base 32 and a movable block 31. The movable base 32 may have side surfaces corresponding to the shape of the external surface of the opposite end portion 12 of the body portion 10. The movable base 32 may have a plate shape and may be coupled to the opposite end portion 12 of the body portion 10. The movable block 31 may protrude from the movable base 32 in the radially outward direction of the body portion 10. The coupling hole 313, into which the second stationary portion shaft 24 is inserted, may be formed through the movable block 31 in one of the tangential directions to the body portion 10.

The side surface of the movable block 31 that faces the second circumferential direction D2 and through which the coupling hole 313 is formed may be referred to as a rear side surface 312. The movable block 31 may have a movable inclined surface 311 that obliquely extends from the rear side surface 312 at an angle between the second axial direction of the body portion 10 and the first circumferential direction D1. The fastening portion 40 may be brought into contact with the movable inclined surface 311. The movable inclined surface 311 may be a flat surface perpendicular to a straight line that extends at an angle between the second axial direction of the body portion 10 and the second circumferential direction D2.

As the fastening portion 40 moves along the axial directions D3 of the body portion 10, the movable portion 30 may move along a fastening inclined surface 411 of the fastening block 41, which will be described below, in the first circumferential direction D1 toward the one end portion 11 of the body portion 10 or in the second circumferential direction D2 away from the one end portion 11 of the body portion 10. The side surface of the movable portion 30 that makes contact with the fastening inclined surface 411 may be the movable inclined surface 311 described above. The fastening inclined surface 411 and the movable inclined surface 311 may be formed to correspond to each other. The fastening inclined surface 411 and the movable inclined surface 311 may slide relative to each other, and therefore the movable portion 30 and the fastening portion 40 may move relative to each other.

The fastening portion 40 may apply pressure to the movable portion 30 to allow the body portion 10 to clamp the hose H1 and the object H2, or may release the pressure to allow the body portion 10 to unclamp the hose H1 and the object H2. The fastening portion 40 may be coupled to the first stationary portion shaft 23 of the stationary portion 20 to be movable along the axial directions D3 of the body portion 10.

The fastening portion 40 may allow the body portion 10 to inwardly press the hose H1, with the opposite end portions 11 and 12 of the body portion 10 moving toward each other. In other words, the fastening portion 40 may move along the first axial direction of the body portion 10 to press the movable portion 30 such that the movable portion 30 moves toward the one end portion 11 of the body portion 10, clamping the hose H1 and the object H2. To unclamp the hose H1 and the object H2, the fastening portion 40 may move along the second axial direction of the body portion 10 to allow the movable portion 30 to be moved away from the one end portion 11 of the body portion 10 by the elasticity of the body portion 10.

Figure 4:
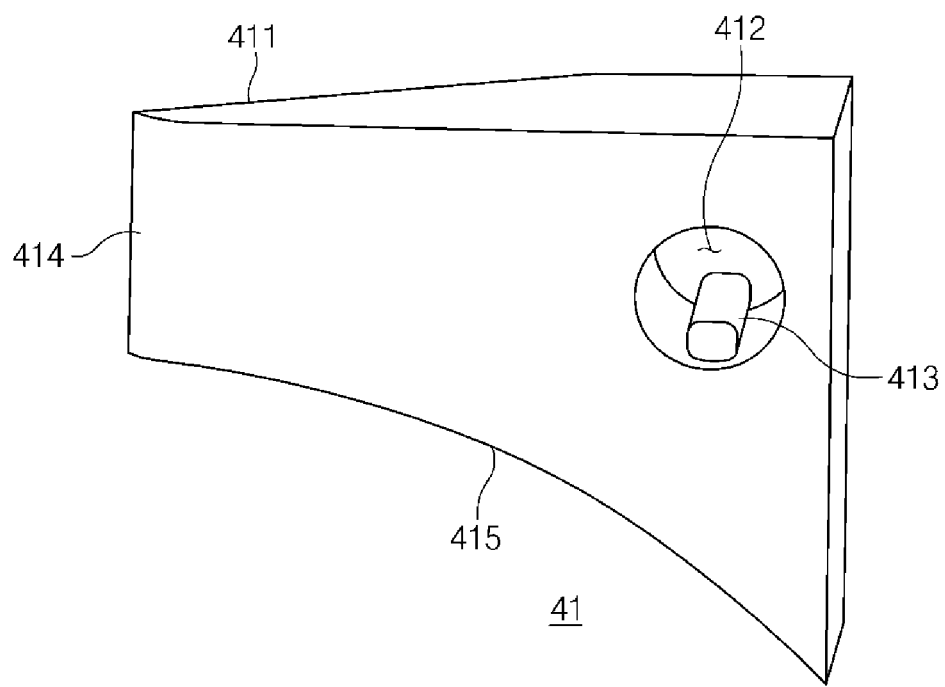
FIG. 4 is a perspective view exemplarily illustrating a fastening block according to an exemplary embodiment of the present invention.

To perform the above-described action, the fastening portion 40 may include the fastening block 41 and a fastening nut 42. FIG. 4 is a perspective view exemplarily illustrating the fastening block 41 according to an exemplary embodiment of the present invention.

The fastening block 41 may include the fastening inclined surface 411, a fixing distal end portion 414, and a fastening hole 412. The fastening hole 412 may be a through-hole into which the first stationary portion shaft 23 is inserted. The fastening hole 412 may be formed through the fastening block 41 in the axial directions D3 of the body portion 10. The fastening protrusion 413 may be formed on the internal surface of the fastening block 41 that defines the fastening hole 412. The fastening protrusion 413 may extend along the axial directions D3 of the body portion 10 in which the first stationary portion shaft 23 extends, and may protrude in a radially inward direction of the fastening hole 412. The fastening protrusion 413 may be inserted into the shaft groove 231 formed on the first stationary portion shaft 23 when the first stationary portion shaft 23 is inserted into the fastening hole 412. Accordingly, the fastening protrusion 413 and the shaft groove 231 may make contact with each other to prevent the fastening block 41 from rotating about the first stationary portion shaft 23.

The fastening inclined surface 411 of the fastening block 41 may be formed on a side of the fastening block 41 that faces the first circumferential direction D1. The fastening inclined surface 411 may be formed to correspond to the shape of the movable inclined surface 311 to make contact with the movable inclined surface 311. The fastening inclined surface 411 may be a flat surface perpendicular to a straight line that extends at an angle between the first axial direction of the body portion 10 and the first circumferential direction D1.

As the fastening portion 40 moves along the axial directions D3 of the body portion 10, the movable inclined surface 311 of the movable portion 30 may slide along the fastening inclined surface 411, and the movable portion 30 may move in the first circumferential direction D1 or the second circumferential direction D2, when the fastening portion 40 moves in the first axial direction of the body portion 10, the movable portion 30 may be pressed to move in the first circumferential direction D1, and when the fastening portion 40 moves in the second axial direction of the body portion 10, the force exerted on the movable portion 30 in the first circumferential direction D1 may be reduced, and the movable portion 30 may move in the second circumferential direction D2.

The fastening block 41 may include the fixing distal end portion 414. The fixing distal end portion 414 may be continuous with the fastening inclined surface 411 and may be formed on a distal end portion of the fastening block 41 that faces the first circumferential direction D1. Due to the shape of the fastening inclined surface 411, the fixing distal end portion 414 may be located on the fastening block 41 to face the second axial direction of the body portion 10. When the fastening block 41 moves a predetermined distance from an original location along the first axial direction of the body portion 10, the fixing distal end portion 414 may make contact with the rear side surface 312 of the movable block 31 to press the movable portion 30 in the first circumferential direction D1. That is, when the movable inclined surface 311 moves along the fastening inclined surface 411 between the second axial direction of the body portion 10 and the first circumferential direction D1 and reaches the distal end portion of the fastening inclined surface 411, the fixing distal end portion 414 of the fastening block 41 may make contact with the rear side surface 312 of the movable block 31.

The fixing distal end portion 414 may be formed of a curved surface continuous with the fastening inclined surface 411. Accordingly, when the fastening block 41 moves in the second axial direction of the body portion 10 in the state in which the fixing distal end portion 414 is in contact with the rear side surface 312, the fixing distal end portion 414 may be smoothly separated from the rear side surface 312 to allow the fastening inclined surface 411 and the movable inclined surface 311 to make contact with each other again.

The fastening block 41 may include the fastening protrusion 413 which is inserted into the shaft groove 231 formed on the first stationary portion shaft 23 to prevent the fastening block 41 from rotating about the first stationary portion shaft 23.

The fastening nut 42 will be described with reference to FIG. 1 and FIG. 2 again. The fastening nut 42 may be coupled to the first stationary portion shaft 23 to be movable along an axial direction of the first stationary portion shaft 23, which is parallel to the axial directions D3 of the body portion 10, while rotating. The first stationary portion shaft 23 may have an external male thread formed on the external circumferential surface thereof, and the fastening nut 42 may have an internal female thread which is formed on the internal circumferential surface thereof and that corresponds to the external male thread of the first stationary portion shaft 23. The fastening nut 42 may move on the first stationary portion shaft 23 along the extension direction of the first stationary portion shaft 23 while rotating about the first stationary portion shaft 23. As the fastening nut 42 moves, the fastening block 41 may be pressed by the fastening nut 42 in the first axial direction of the body portion 10, or may be pressed by the movable portion 30 in the second axial direction of the body portion 10 due to the elasticity of the body portion 10, and therefore the fastening block 41 may move along the axial directions D3 of the body portion 10.

Hereinafter, a process of operating the hose clamp 1 to allow the hose clamp 1 to clamp the hose H1 and the object H2 according to an exemplary embodiment of the present invention will be described with reference to FIG. 5, FIG. 6 and FIG. 7.

Figure 5:
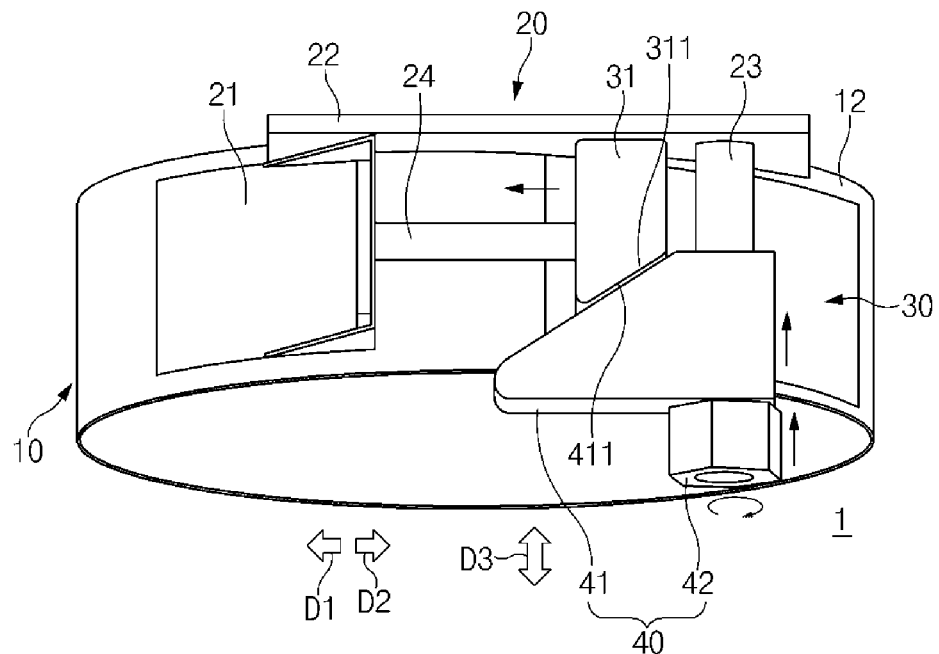
FIG. 5 is a view exemplarily illustrating a state in which the hose clamp is not fastened, according to an exemplary embodiment of the present invention.
Figure 6:
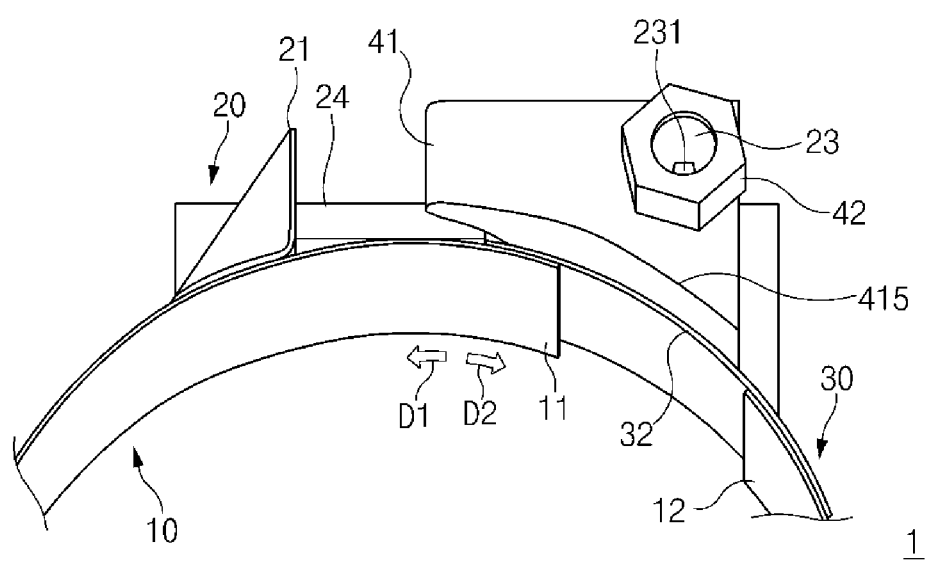
FIG. 6 is a bottom view exemplarily illustrating the hose clamp of FIG. 5.

FIG. 5 is a view exemplarily illustrating a state in which the hose clamp 1 is not fastened, according to an exemplary embodiment of the present invention. FIG. 6 is a bottom view exemplarily illustrating the hose clamp 1 of FIG. 5. Referring to FIG. 5 and FIG. 6, the fastening block 41 may be located on the distal end portion of the first stationary portion shaft 23 that faces the second axial direction of the body portion 10, and the movable block 31 may make contact with the fastening inclined surface 411 of the fastening block 41. Therefore, the opposite end portions 11 and 12 of the body portion 10 may be spaced from each other with a large interval therebetween, and the hose H1 and the object H2 to be fastened may be freely inserted into the internal space 13 of the body portion 10.

The movable base 32 of the movable portion 30, which is coupled to the opposite end portion 12 of the body portion 10, may be brought into contact with the one end portion 11 of the body portion 10.

Figure 7:
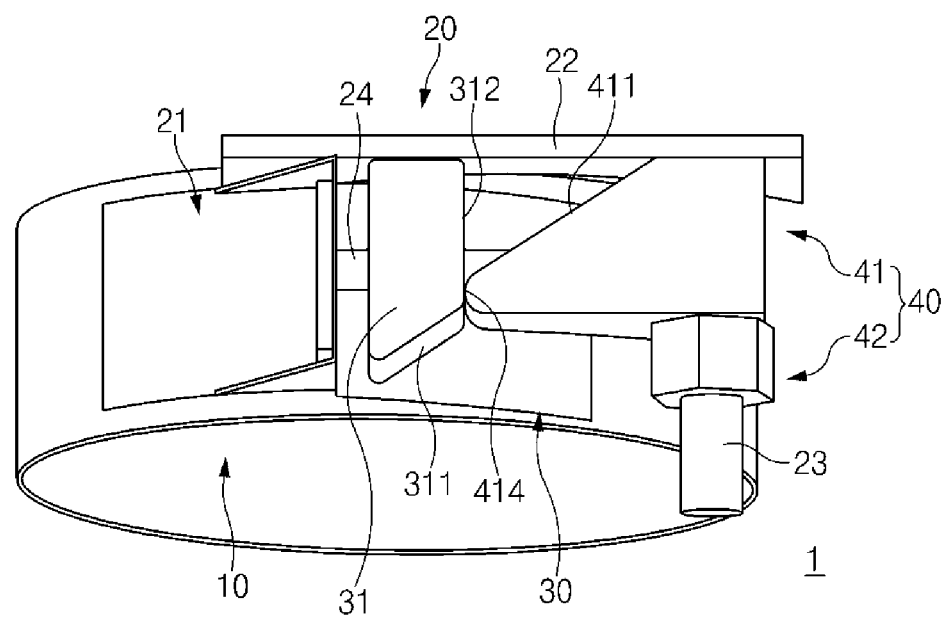
FIG. 7 is a view exemplarily illustrating a state in which the hose clamp is fastened, according to an exemplary embodiment of the present invention.

FIG. 7 is a view exemplarily illustrating a state in which the hose clamp 1 is fastened, according to an exemplary embodiment of the present invention. In the state illustrated in FIG. 6, the hose H1 and the object H2 to be fastened may be inserted into the opposite sides of the body portion 10 along the axial directions D3 of the body portion 10, after which the fastening nut 42 may be rotated. The fastening nut 42 may move along an axial direction of the first stationary portion shaft 23 in the first axial direction of the body portion 10 while rotating. With the movement of the fastening nut 42, the fastening block 41 may be pushed in the same direction thereof. Since the fastening protrusion 413 formed on the fastening block 41 is inserted into the shaft groove 231, the fastening block 41 may be pushed while maintaining a correct posture without rotating.

As the fastening block 41 moves, the movable block 31 may move along the second stationary portion shaft 24 in the first circumferential direction D1 since the movable inclined surface 311 of the movable block 31 is brought into contact with the fastening inclined surface 411. With the movement of the movable block 31, the opposite end portion 12 of the body portion 10 coupled to the movable portion 30 may move in the same direction as the movable block 31. Therefore, the opposite end portions 11 and 12 of the body portion 10 may become closer to each other and the internal circumferential surface of the body portion 10 may press and clamp the external surfaces of the hose H1 and the object H2 in the radially inward direction thereof.

The fastening block 41 may continue to be moved. Accordingly, the fastening inclined surface 411 and the movable inclined surface 311 may not make contact with each other, and the fixing distal end portion 414 may be brought into contact with the rear side surface 312 as illustrated in FIG. 7. Since the fastening block 41 and the movable block 31 do not make contact with each other along the inclined surfaces 411 and 311, which are inclined with respect to the direction of the applied force, and the fixing distal end portion 414 and the rear side surface 312 make contact with each other in the direction parallel to the elastic restoring force of the body portion 10, the fastening block 41 may fix the movable block 31 well against the elastic restoring force of the body portion 10.

The fastening nut 42 may be rotated in the opposite direction to unclamp the hose H1 and the object H2. The fastening nut 42 may be moved in the second axial direction of the body portion 10. The elastic restoring force of the body portion 10 may be continuously exerted on the movable block 31 in the second circumferential direction D2, and the movable block 31 may press the fastening block 41 in the same direction thereof. Accordingly, while the fastening nut 42 moves away from the fastening block 41, the fastening block 41 may slide from the rear side surface 312 along the curved surface of the fixing distal end portion 414 and may move in the direction in which the fastening nut 42 moves, and the fastening inclined surface 411 and the movable inclined surface 311 may make contact with each other again. As the fastening nut 42 continues to be rotated in the same direction thereof, the fastening block 41 may be moved by the elastic restoring force of the body portion 10 in the same direction as the fastening nut 42, and the movable block 31 may move along the fastening inclined surface 411 in the second circumferential direction D2. Accordingly, the opposite end portion 12 of the body portion 10 may move away from the one end portion 11 of the body portion 10. The hose clamp 1 may be changed from the state illustrated in FIG. 7 to the state illustrated in FIG. 5 and FIG. 6, and therefore the hose H1 and the object H2 may be separated from the hose clamp 1.

Figure 8:
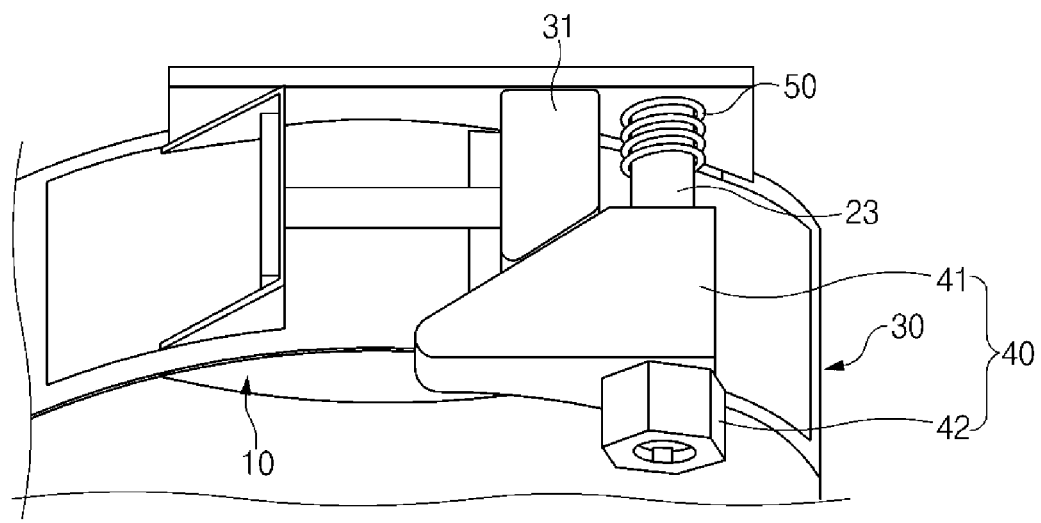
FIG. 8 is a view exemplarily illustrating a modified example of the hose clamp according to the exemplary embodiment of the present invention.

FIG. 8 is a view exemplarily illustrating a modified example of the hose clamp 1 according to the exemplary embodiment of the present invention.

The modified example of the hose clamp 1 according to the exemplary embodiment of the present invention may further include an elastic member 50. Descriptions of other components will be substituted with the descriptions of the components of the hose clamp 1 according to the exemplary embodiment of the present invention. The elastic member 50 may be included in the stationary portion 20. The elastic member 50 may be coupled to the stationary extension 22 and may be disposed to surround the first stationary portion shaft 23. When the fastening portion 40 moves along the first axial direction of the body portion 10, the elastic member 50 may be compressed to exert a restoring force on the fastening portion 40 in the second axial direction of the body portion 10. Accordingly, in the state in which the fastening block 41 moves to the maximum in the first axial direction of the body portion 10 and the fixing distal end portion 414 and the rear side surface 312 make contact with each other, the elastic member 50 may push the fastening block 41 to allow the fastening inclined surface 411 and the movable inclined surface 311 to easily make contact with each other when the fastening nut 42 is moved in the second axial direction of the body portion 10 while rotating.

According to the exemplary embodiments of the present invention, the hose clamp may be fastened in the axial direction thereof and may be prevented from being loosened in the reverse direction thereof.

Hereinabove, even though all of the constituent elements are coupled into one body or operate in a combined state in the description of the above-mentioned embodiments of the present invention, the present invention is not limited to these embodiments. That is, all of the constituent elements may operate in one or more selective combination within the range of the purpose of the present invention. It may be also understood that the terms of "include", "comprise" or "have" in the specification are "open type" expressions just to say that the corresponding constituent elements exit and, unless described to the contrary, do not exclude but may include additional components. Unless otherwise defined, all terms used herein, including technical and scientific terms, have the same meaning as those understood by those skilled in the art to which the present invention pertains. Such terms as those defined in a used dictionary are to be interpreted as having meanings equal to the contextual meanings in the relevant field of art, and are not to be interpreted as having ideal or excessively formal meanings unless clearly defined as having such in the present application.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hose clamp comprising:
    a body portion having an annular shape which is disconnected at a portion thereof, the body portion being configured to surround an external surface of a hose and an external surface of an object to be fastened;
    a stationary portion coupled to an external surface of a first end portion of the body portion;
    a movable portion coupled to an external surface of a second end portion of the body portion; and
    a fastening portion coupled to the stationary portion to be movable along axial directions of the body portion,
    wherein the fastening portion is configured to move along a first axial direction which is one of the axial directions of the body portion and to press the movable portion in a first circumferential direction of the body portion such that the first end portion and the second end portion of the body portion move toward each other and the body portion inwardly presses and fastens the hose and the object when the fastening portion moves toward the stationary portion.

2. The hose clamp of claim 1,
    wherein the movable portion includes a movable inclined surface,
    wherein the fastening portion includes a fastening inclined surface configured to contact with the movable inclined surface and formed to correspond to a shape of the movable inclined surface, and
    wherein as the fastening portion moves along the axial directions of the body portion, the movable portion moves along the fastening inclined surface in the first circumferential direction of the body portion in which the second end portion of the body portion moves toward the first end portion of the body portion or in a second circumferential direction of the body portion in which the second end portion of the body portion moves away from the first end portion of the body portion.

3. The hose clamp of claim 2,
    wherein the movable portion further includes a rear side surface continuous with the movable inclined surface, the rear side surface being configured to face the second circumferential direction,
    wherein the fastening portion further includes a fixing distal end portion configured to contact with the rear side surface and press the movable portion in the first circumferential direction when moving a predetermined distance from an original location along the first axial direction of the body portion, and
    wherein the fixing distal end portion is continuous with the fastening inclined surface and is located on a side of the fastening portion that faces a second axial direction which is one of the axial directions of the body portion, the second axial direction being opposite to the first axial direction of the body portion.

4. The hose clamp of claim 3, wherein the fixing distal end portion includes a curved surface continuous with the fastening inclined surface.

5. The hose clamp of claim 1, wherein the stationary portion includes:
    a stationary base coupled to the first end portion of the body portion;

a stationary extension extending from the stationary base toward the second end portion of the body portion; and a first stationary portion shaft extending from the stationary extension along a second axial direction which is one of the axial directions of the body portion, the second axial direction being opposite to the first axial direction of the body portion, wherein the fastening portion is coupled to the first stationary portion shaft to be movable along an axial direction of the first stationary portion shaft.

6. The hose clamp of claim 5, wherein the stationary portion further includes:

a second stationary portion shaft to which the movable portion is slidably coupled to be movable between the first end portion and the second end portion of the body portion.

7. The hose clamp of claim 5, wherein the fastening portion includes:

a fastening block coupled to the first stationary portion shaft to be movable along the axial directions of the body portion; and a fastening member coupled to the first stationary portion shaft to be movable along the first stationary portion shaft while rotating about the first stationary portion shaft, the fastening member being configured to rotate to press and move the fastening block along the first stationary portion shaft.

8. The hose clamp of claim 7, wherein the first stationary portion shaft has a shaft groove formed on an external surface of the first stationary portion shaft along a longitudinal direction of the first stationary portion shaft, and wherein the fastening block includes a fastening protrusion inserted into the shaft groove to prevent the fastening block from rotating about the first stationary portion shaft.

9. The hose clamp of claim 8, wherein the fastening block includes a fastening hole, wherein the fastening protrusion is formed on an inner surface of the fastening hole, and wherein the shaft groove of the first stationary portion shaft is coupled to the fastening protrusion in the fastening hole of the fastening block to prevent the fastening block from rotating about the first stationary portion shaft.

10. The hose clamp of claim 5, wherein the stationary portion further includes an elastic member coupled to the stationary extension and mounted to surround the first stationary portion shaft, and wherein the elastic member is compressed to exert a restoring force on the fastening portion in the second axial direction of the body portion when the fastening portion moves along the first axial direction of the body portion.

* * * * *